Oct. 9, 1956

E. H. KRUSE ET AL 2,765,651

APPARATUS FOR INDICATING THE PERCENTAGE
OF ALCOHOL IN ALCOHOLIC LIQUIDS
Filed May 24, 1952

INVENTORS
EUGENE H. KRUSE
BY MAHLON E. RIEKE

*Lockwood, Galt, Woodard & Smith*

ATTORNEYS

United States Patent Office 2,765,651
Patented Oct. 9, 1956

2,765,651

APPARATUS FOR INDICATING THE PERCENTAGE OF ALCOHOL IN ALCOHOLIC LIQUIDS

Eugene H. Kruse, Hamilton, and Mahlon E. Rieke, Auburn, Ind.

Application May 24, 1952, Serial No. 289,764

3 Claims. (Cl. 73—53)

This invention relates generally to measuring devices and more particularly it relates to devices for measuring the alcoholic content of mixed alcoholic beverages such for example as cocktails and highballs.

When purchasing alcoholic beverages there is no way of ascertaining as to whether or not a mixed alcoholic beverage has the alcoholic content which it is supposed to have or is intended to have due to the fact that it is customary in bars and other places where alcoholic beverages are dispensed to pour the liquor from a bottle which has been opened prior to the time of the purchase. It has been known to happen that liquor in the bottle has been diluted after the bottle was opened whereby the purchaser may be served a beverage containing diluted liquor.

Accordingly, it is the principal object of this invention to provide a measuring device adapted to indicate approximately the alcoholic content of a mixed alcoholic beverage.

Still another object of this invention is to provide a measuring device which is simple in structure and easily carried upon the person much in the same manner as a pen or pencil.

In accordance with this invention there is provided an alcohol measuring device comprising a tubular member closed at one end by a resilient bulb and open at the other and including, adjacent to the open end, restricted openings of such a size that liquids containing high percentages of alcohol will drain to a limited extent through the apertures.

For a better understanding of the invention, together with other and further objects thereof, reference is made to the following description, taken in connection with the accompanying drawings, and its scope will be pointed out in the appended claims.

Figure 1:
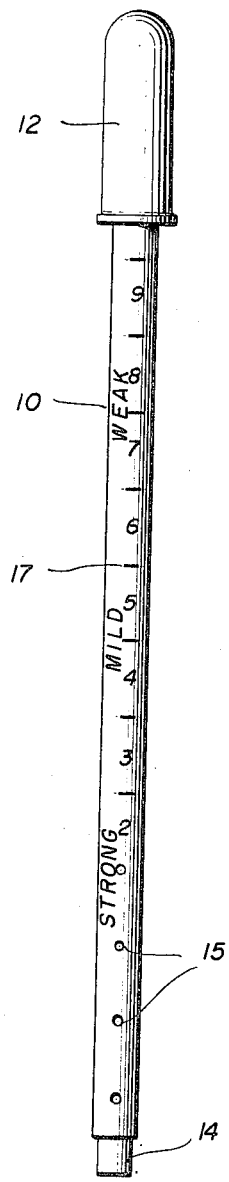
Fig. 1 is a front view of a measuring device for measuring the alcoholic content of beverages.
Figure 2:
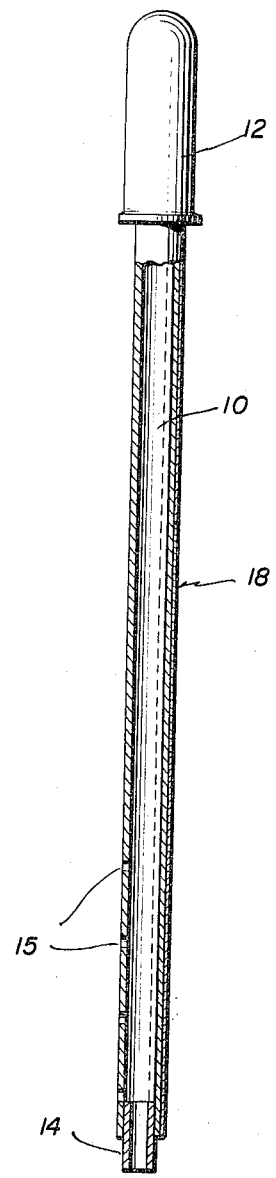
Fig. 2 is a partial cross-section taken longitudinally of Fig. 1.

Referring to the drawings, as provided in accordance with this invention a tubular member, such for example, as a glass tube having an internal diameter of approximately three sixteenth of an inch. One end of the tube 10 may be closed by means of a rubber or other resilient bulb 12 for drawing and expelling liquid into or out of the tube 10. The lower end of the tube includes a restricted intake port 14 having an internal diameter of approximately one-eighth of an inch and through which liquid may enter the tube 10 after the bulb 12 has been compressed and released. At the lower end of the tube 10 there is provided a plurality of apertures 15 which are restricted in size and have a diameter of approximately one-sixty-fourth of an inch. The diameter of apertures 15 is determined more or less by experiment the size being that which will permit a tube full of alcohol of 180 proof to drain completely. Because of the viscosity or surface tension or specific gravity of a mixture of water and alcohol, a liquid having a high alcoholic content will drain through the small apertures 15 whereas a liquid which comprises substantially 100% water will not drain out of the apertures 15. If the tube 10 is full of water substantially all of the water remains within the tube. If the liquid is 180 proof alcohol, substantially none of it will remain in the tube.

For indicating the relative alcoholic content of different percentages of mixtures, there may be inscribed on the tube 10 a scale 17 together with legends "Strong", "Mild", "Weak". Thus when the tube is filled with the liquid and then permitted to drain to a state of stability the upper level of the liquid will be at a point on the scale 17 indicative, approximately, of the alcoholic content of the liquid. If the liquid is substantially all water then the upper level thereof will be in the vicinity of the numeral 9 on the tube. On the other hand if the liquid is relatively strong in alcoholic content its upper level may be at the level indicated by the numeral 4 on the tube. An alternative scale may be in the form of a vari-colored index 18 coated on the interior of the tube.

In using the measuring device provided in accordance with this invention, a person may purchase an alcoholic beverage and insert the tube 10 into the drink covering apertures 15 and then squeeze the bulb 12. Upon release of pressure from bulb 12, the liquid will be drawn into the tube 10. When the tube is removed from the container, the liquid will drain through the holes 15 until such time as the viscosity, surface tension or specific gravity prevents further drainage. It is not known whether it is the viscosity, the surface tension or the specific gravity of the liquid which effects its ability to drain through the hole 15. At any rate the liquid assumes a certain level within the tube 10 in accordance with its alcoholic content. A liquid which is low in alcoholic content maintains relatively high level in the tube 10 while a liquid having a relatively high alcoholic content maintains a much lower level in the tube 10. Liquids of either classification do not drain from port 14. Thus, the user may note the upper level of the liquid together with the scale reading adjacent to the upper level of the liquid and thus obtain a measurement of the alcoholic content of his beverage.

From the foregoing description it will be apparent that there is provided in accordance with this invention a measuring device for determining the alcoholic content of alcoholic beverages which is of small size and handily carried in the pocket. The invention provides a means whereby a purchaser of a mixed alcoholic beverage may determine within reasonable limits whether or not he has received a diluted mixture of liquor and other conventional components of mixed drinks.

It will readily be understood by persons of ordinary skill in the art that this invention is applicable to measure the alcoholic content of other liquids such, for example, as antifreeze solutions, patent medicines, or the like.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A measuring device for indicating the alcoholic content of alcoholic solutions comprising an elongated tube open at both ends, a flexible bulb fixed to one end for drawing liquid into said tube and a plurality of axially spaced apertures in said tube extending from a point adjacent the other end of said tube, said apertures being smaller than the opening of said other tube end and still further being of such size as to allow the drainage there-through of liquid drawn into said tube but to limit said drainage to such an extent that a column of liquid will be retained in such tube at a height dependent upon the alcoholic content thereof, said other end opening having a bore of greater length than its diameter.

2. A measuring device for indicating the alcoholic content of alcoholic solutions comprising a tubular member having axially spaced apertures formed therein near one end, said apertures being spaced apart predetermined distances and made to predetermined sizes for draining liquid from the tube in accordance with its alcoholic content, said apertures having bores which are of such length dimensions as compared to the respective diametral dimensions as to have the ability to retain an amount of an alcoholic mixture in said tubular member corresponding to its alcoholic content.

3. A measuring device for indicating the alcoholic content of alcoholic mixtures comprising a tubular member having axially spaced apertures near one end, said apertures having bores which are of such length dimensions as compared to the respective diametral dimensions as to have the ability to retain an amount of an alcoholic mixture in said tubular member corresponding to its alcoholic content, and means for filling said tubular member with said mixture.

References Cited in the file of this patent

UNITED STATES PATENTS

| | | |
|---|---|---|
| 1,738,152 | Porter | Dec. 3, 1929 |
| 2,596,083 | Wahlbeck | May 6, 1952 |